United States Patent
Gebhart et al.

(10) Patent No.: US 6,604,150 B1
(45) Date of Patent: Aug. 5, 2003

(54) INTEGRATION OF GUI APPLICATION WITH EXTERNAL APPLICATION EXTENSIONS

(75) Inventors: Alexander Gebhart, Koengen (DE); Dieter Gottschall, Herrenberg (DE); Juergen Jung, Aidlingen (DE); Silke Wastl, Markgroeningen (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/478,135

(22) Filed: Jan. 5, 2000

(30) Foreign Application Priority Data

Feb. 6, 1999 (EP) .............................................. 99102336

(51) Int. Cl.[7] .............................................. G06F 9/00
(52) U.S. Cl. ........................ 709/328; 709/329; 709/206; 709/226; 709/230; 709/243; 345/804; 345/809; 345/810
(58) Field of Search ................................. 709/200, 206, 709/226, 228, 230, 328, 329, 318; 345/804, 809, 810, 825

(56) References Cited

U.S. PATENT DOCUMENTS

| | | | | |
|---|---|---|---|---|
| 5,613,090 A | * | 3/1997 | Willems | 709/329 |
| 5,680,551 A | * | 10/1997 | Martino, II | 709/226 |
| 5,687,373 A | * | 11/1997 | Holmes et al. | 709/328 |
| 5,724,506 A | * | 3/1998 | Cleron | 709/230 |
| 5,767,849 A | * | 6/1998 | Borgendale et al. | 345/745 |
| 5,907,843 A | * | 5/1999 | Cleron et al. | 707/1 |
| 5,983,265 A | * | 11/1999 | Martino, II | 709/206 |
| 6,122,675 A | * | 9/2000 | Fisher et al. | 709/318 |
| 6,199,160 B1 | * | 3/2001 | Echensperger et al. | 713/100 |
| 6,212,575 B1 | * | 4/2001 | Cleron et al. | 709/328 |
| 6,373,507 B1 | * | 4/2002 | Camara et al. | 345/825 |

* cited by examiner

Primary Examiner—Majid Banankhah
(74) Attorney, Agent, or Firm—James R. Nock

(57) ABSTRACT

A computerized method for dynamically extending a main application comprising a first user-interface-control by at least one supplementary application is proposed. The method comprises a first-step of monitoring system-messages of a system-message-queue and determines if a monitored system-messages comprises a user-interaction-request for creating said first user-interface-control of said main application. In the affirmative case, an indicator is set that said user-interaction-request for creating said first user-interface-control has been detected. Said method comprises a second-step monitoring application-messages of an application-message-queue and associates in response to setting said indicator the next one or multitude of application-message with said monitored system-message. Said method interprets said next one or multitude of application-message as application-message comprising the request for creating said first user-interface-control by determining based on said next application-message a first user-interface-control-handle, which is used by said GUI system as unique identification of said first user-interface-control. Finally said method executes said supplementary application.

12 Claims, 12 Drawing Sheets

Typical messages:

SYSTEM Msg Id: 0x115, Param 1: 0x0045, Param 2: 0x0, Msg Handle: 0x21e0544
SYSTEM Msg Id: 0x231, Param 1: 0x1634, Param 2: 0x0, Msg Handle: 0x21e0884
SYSTEM Msg Id: 0x141, Param 1: 0x5671, Param 2: 0x0, Msg Handle: 0x21e0394
SYSTEM Msg Id: 0x151, Param 1: 0x7801, Param 2: 0x0, Msg Handle: 0x21e0334
SYSTEM Msg Id: 0x413, Param 1: 0x1781, Param 2: 0x0, Msg Handle: 0x21e0254
SYSTEM Msg Id: 0x541, Param 1: 0x1697, Param 2: 0x0, Msg Handle: 0x21e0288
SYSTEM Msg Id: 0x144, Param 1: 0x4701, Param 2: 0x0, Msg Handle: 0x21e0449
SYSTEM Msg Id: 0x111, Param 1: 0x1601, Param 2: 0x0, Msg Handle: 0x21e0244

Typical messages:

APPL Msg Id: 0x133, Param 1: 0xd30103e4, Param 2: 0xd702de, Msg Handle: 0x1110380
APPL Msg Id: 0xf, Param 1: 0x0, Param 2: 0x0, Msg Handle: 0xda03c4
APPL Msg Id: 0x8, Param 1: 0x1110380, Param 2: 0x0, Msg Handle: 0xda03c4
APPL Msg Id: 0x7, Param 1: 0xda03c4, Param 2: 0x0, Msg Handle: 0x1110380
APPL Msg Id: 0x8, Param 1: 0xd702de, Param 2: 0x0, Msg Handle: 0x1110380
APPL Msg Id: 0x7, Param 1: 0x1110380, Param 2: 0x0, Msg Handle: 0xd702de
APPL Msg Id: 0x133, Param 1: 0xd30103e4, Param 2: 0xd702de, Msg Handle: 0x1110380
APPL Msg Id: 0x111, Param 1: 0x1001783, Param 2: 0xd702de, Msg Handle: 0x1110380
APPL Msg Id: 0xb1, Param 1: 0x0, Param 2: 0xffffffff, Msg Handle: 0xd702de

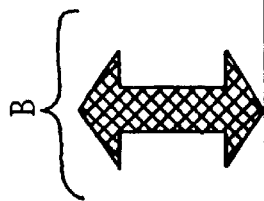
B

FIG. 5C

INTEGRATION OF GUI APPLICATION WITH EXTERNAL APPLICATION EXTENSIONS

TECHNICAL FIELD

The present invention relates to an integration technology for extending an application with a message-based user interface by an independent supplementary application.

BACKGROUND OF THE INVENTION

According to the current state of the art applications executed by modern operating systems are offering their functionality by some sort of user interface. In many cases the user interfaces are of graphical nature and one is talking of so-called GUI (Graphical User Interface) applications. Microsoft Windows, IBM OS/2 or Mac OS are some well-known examples of modern operating systems providing such graphical user interface technology. According to this state of the art technology the operating system and the GUI application are exchanging information units, called messages, used on one hand to inform the GUI application of the particular user interactions with respect to the particular user interface. On the other hand the messages are used by the GUI application to requests changes of the particular user interface in response to reported user interactions. Further information may be found for instance in Charles Petzold, Programming the OS/2 Presentation Manager, Microsoft Press, Redmond 1989.

The handling and exchange of these messages via message queues exchanged by the operating system and the GUI application is done on a programming level, i.e. the source code level of the application, only; with the result that the setup and handling of an application's particular user interface is an application internal aspect; other applications, i.e. the application's "external world", are excluded from participating within the application's particular user interface: Therefore the other applications cannot be integrated within the particular user interface of a certain application.

On the other hand there is a strong requirement that within the user interface of a certain application, for convenience for the further discussion it can be called the main application, other applications, for the further discussion we call them supplementary applications, can be integrated to for instance provide additional functions or to cooperate with the main application. The user of this particular interface should get the impression of interacting with a single application only.

Two technologies are available to cope with this problem.

In a first approach the source code of the main application is adapted accordingly, which means that additional program code for further user interface capabilities is included and provisions are integrated that, depending on user's interactions with the user interface, supplementary application code is called and executed. Apparently this approach is only possible if the source code of the main application is available. Typically applications can be commercially bought in an executable, i.e. binary, version only with the result, that this first approach is excluded in almost all practical cases.

In a second approach the main application provides a set of application programming interfaces (API) which can be called by a supplementary application and which allow this supplementary application to participate within the processing of the main application. In this case, the supplementary application depends on the set of APIs provided by the existing main application. Functionalities and integration capabilities not supported by these APIs cannot be implemented and thus integration is only possible to the extend foreseen by the provider of the main application in terms of the set of APIs.

Thus the technical approaches for integration of GUI application, if available at all, are very limited.

SUMMARY OF THE INVENTION

The invention is based on the objective to provide an improved integration methodology supporting integration of a supplementary application within a main application and the main application's user interface.

It is a further objective of the current invention that the proposed integration methodology provides integration without requiring any provisions within the main applications and without requiring invasive changes in the main application.

The objectives of the invention are solved by the independent claims. Further advantageous arrangements and embodiments of the invention are set forth in the respective subclaims.

The invention relates to a computerized method for dynamically extending a main application comprising a first user-interface-control by at least one supplementary application.

The method comprises a first-step of monitoring system-messages of a system-message-queue, said system-message-queue transferring one or more system-messages comprising user-interaction-requests to said main application, and determines if a monitored system-messages comprises a user-interaction-request for creating said first user-interface-control of said main application. In the affirmative case, an indicator is set that said user-interaction-request for creating said first user-interface-control has been detected. Said method comprises a second-step monitoring application-messages of an application-message-queue, said application-message-queue transferring one or more application-messages comprising a request for said main application, and associates in response to setting said indicator the next one or multitude of application-message with said monitored system-message. Said method interprets said next one or multitude of application-message as application-message comprising the request for creating said first user-interface-control by determining based on said next application-message a first user-interface-control-handle, which is used by said GUI system as unique identification of said first user-interface-control. Finally said method executes said supplementary application.

The current invention provides an integration technology for extending an application with a message-based user interface by an independent supplementary application. The current approach completely avoids rewriting or modifying and recompiling the existing application, which in most cases is not possible because the existing main application and the supplementary application which should be integrated are owned by different companies or different divisions within a company; in most cases the source code of the main application is therefore not available. Also the current approach does not depend on any API provided for integration purposes by the main application. Even the best set of APIs (the known approaches based on plug-ins also fall under this category) cannot provide all the functionality which might be needed at a future point in time. Restrictions set up by main applications distinguishing between GUI elements which are allowed to be modified and others which are not are removed completely. These advantages are achieved as the roles of the main application and the supplementary application to be integrated are reversed with respect to an important aspect: while in the state of the art approaches the main application controls under which circumstances and to which extend the supplementary application maybe integrated, these roles are reversed by the current invention; now it is the supplementary application only controlling the point of integration. The result is a proposed integration approach which is noninvasive, dynamic and transparent with respect to the main application.

The current invention provides an integration technology for extending an application with a message-based user interface by an independent supplementary application. The current approach completely avoids rewriting or modifying and recompiling the existing application, which in most cases is not possible because the existing main application and the supplementary application which should be integrated are owned by different companies or different divisions within a company; in most cases the source code of the main application is therefore not available. Also the current approach does not depend on any API provided for integration purposes by the main application. Even the best set of APIs (the known approaches based on plug-ins also fall under this category) cannot provide all the functionality which might be needed at a future point in time. Restrictions set up by main applications distinguishing between GUI elements which are allowed to be modified and others which are not are removed completely. These advantages are achieved as the roles of the main application and the supplementary application to be integrated are reversed with respect to an important aspect: while in the state of the art approaches the main application controls under which circumstances and to which extend the supplementary application maybe integrated, these roles are reversed by the current invention; now it is the supplementary application only controlling the point of integration. The result is a proposed integration approach which is noninvasive, dynamic and transparent with respect to the main application.

Moreover the suggested integration approach allows the supplementary to collect data from the main application's user-interface and use it as additional input to the processing of the supplementary application. Based on the same mechanisms output data generated by the supplementary application can be propagate back to the main application again.

As an further advantage the invention supports the creation of supplementary user-interface-controls in context of the user-interface-controls of the main application. The user interface integration is seamless and a user has the impression of a homogeneous user-interface while actually the supplementary user-interface-control being responsive to user interactions is controlled by said supplementary application. This reduces the educational effort for users and provides him with a consistent look and feel. Assuming for example a word processor: after a document is written, there are certain actions possible using today's word processors: save the document, perform spell checking, check hyphenation and many others. But the document cannot be sent as e-mail or stored in a document management system. Do this, other programs with other GUIs, other keyboard settings, other help systems and so on have to be used. But all what actually is required is an additional button which invokes a function in an additional application which sends the document as e-mail or does a check-in into a document management system. The invention offers a new possibility to do this dynamically if other possibilities are not available.

Monitoring the application queue allows the supplementary application also to participate with the supplementary user-interface-control with respect changes of position, size etc. and other representation aspects of the main application's user-interface-control context completing the impression that the supplementary user-interface-control is actually part of the main application.

As a further advantage the current teaching supports a two-way data exchange between main and supplementary application: the supplementary application can access via the first user-interface-control-handle user interface data from the main application or even can propagate modifications from the supplementary application to the main application.

With the proposed technique it is also possible to track and protocol by a supplementary application any user interactions of that user with the user-interface of the main application in a protocol record for later evaluation.

Another advantage is that the same mechanism can be used to simulate user interaction with the main application by inserting through a supplementary application stored user interactions into the main application for their processing.

BRIEF DESCRIPTION OF THE DRAWINGS

FIGS. 5A, 5B, and 5C (hereinafter referred to as FIG. 5) give an overview on the system message queue, the application message queue and the corresponding hooks according to the current invention.

DETAILED DESCRIPTION OF THE INVENTION

The current invention is illustrated based on a concrete example of the graphical user interface of Lotus Notes.

Within this main application there are static windows which cannot be modified by the Notes API. Thus it is not possible to integrate another supplementary application that uses these windows, adds another GUI element and via that way integrates an own function. Of course any other GUI application could be used instead.

Furthermore the terms GUI application and GUI user interface have to be understood in their most general sense referring to applications with user interfaces controls and a message based control flow in between these elements. In that sense the term graphical user interface serves place holder, for all kind of user interfaces independently whether the user interface comprises elements of "graphical" nature.

Even if the current description shows how the invention can be used to integrate two GUI applications, this technique can also be used to integrate a GUI and a non-GUI application or two non-GUI applications. The only prerequisite is that the applications to be integrated are message based applications.

In the description it is shown how two message hooks work together to achieve the integration solution. In the proposed example, the system message hook triggers the application message hook. Of course the proposed teaching can also be applied to the reverse situation wherein the application message hook triggers the system message hook vice versa. Thus the distinction between the system message and the application message queue is not essential.

The proposed teaching assumes a message based operating system like for example OS/2 or MS Windows and deals with message based applications. A message according to the current terminology is to be understood as a conceptual model only whereas the actual implementation may deviate thereof.

The following description shows how the invention can be used to integrate a supplementary (in many cases this will be a self-written application extension or a second application developed and purchased independently from the main application) GUI application into an existing main GUI application (in the following also called "existing" application as it has to be taken as it is with respect to integration). In the context of this description, the existing main application represents an application which has to be taken as is. As an example of such an existing main application, Lotus Notes is used though any other GUI application may be used instead.

The goal is to integrate a supplementary application into a main application allowing a user to implicitly call, via interactions with the user interface, a function inside this supplementary application from the main application's context.

Figure 1:
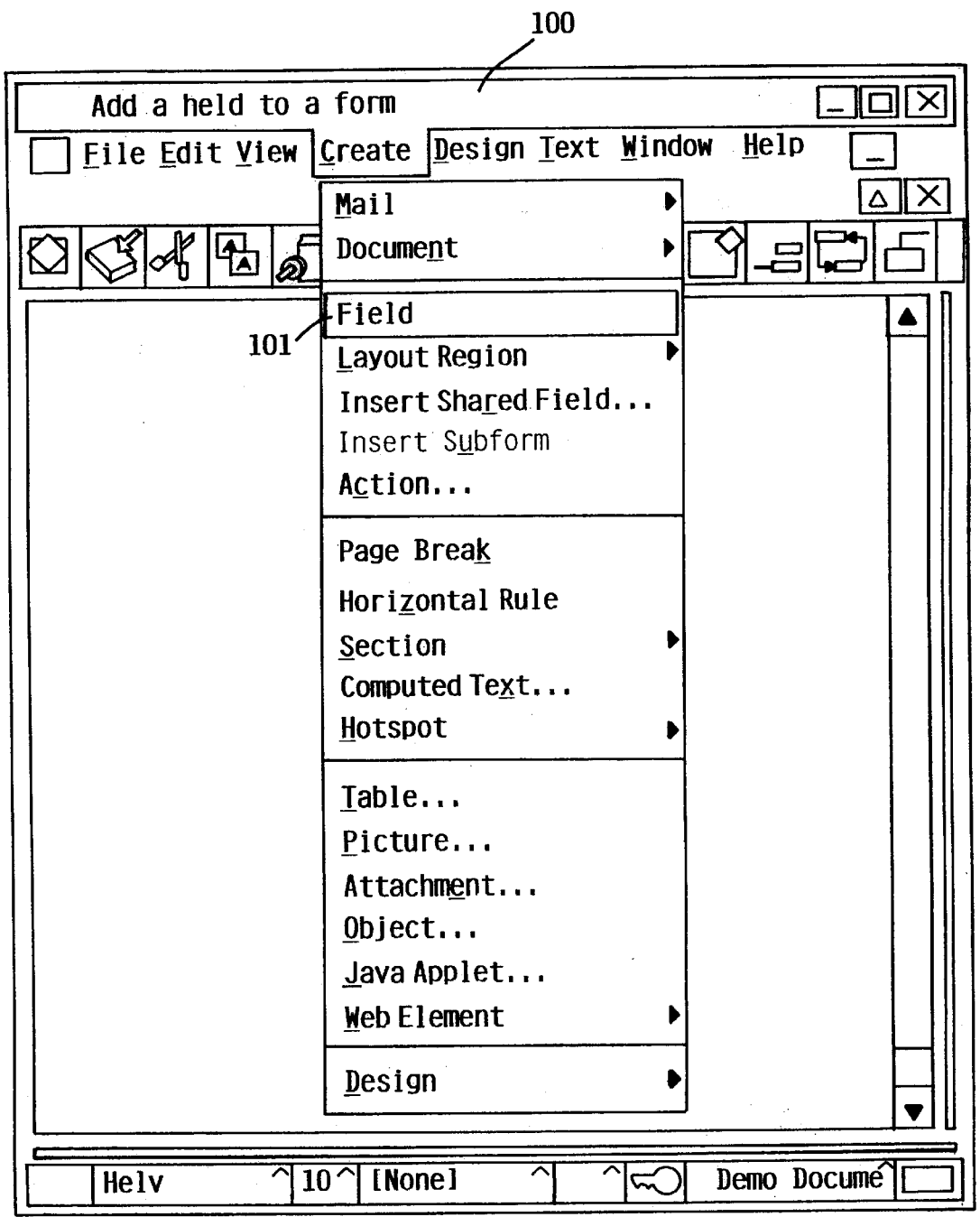
FIG. 1 shows how a user chooses the action "Create Field" within the main application initiating navigation to that user interface control of the main application which will be extended by a supplementary user interface control of the supplementary application.
Figure 2:
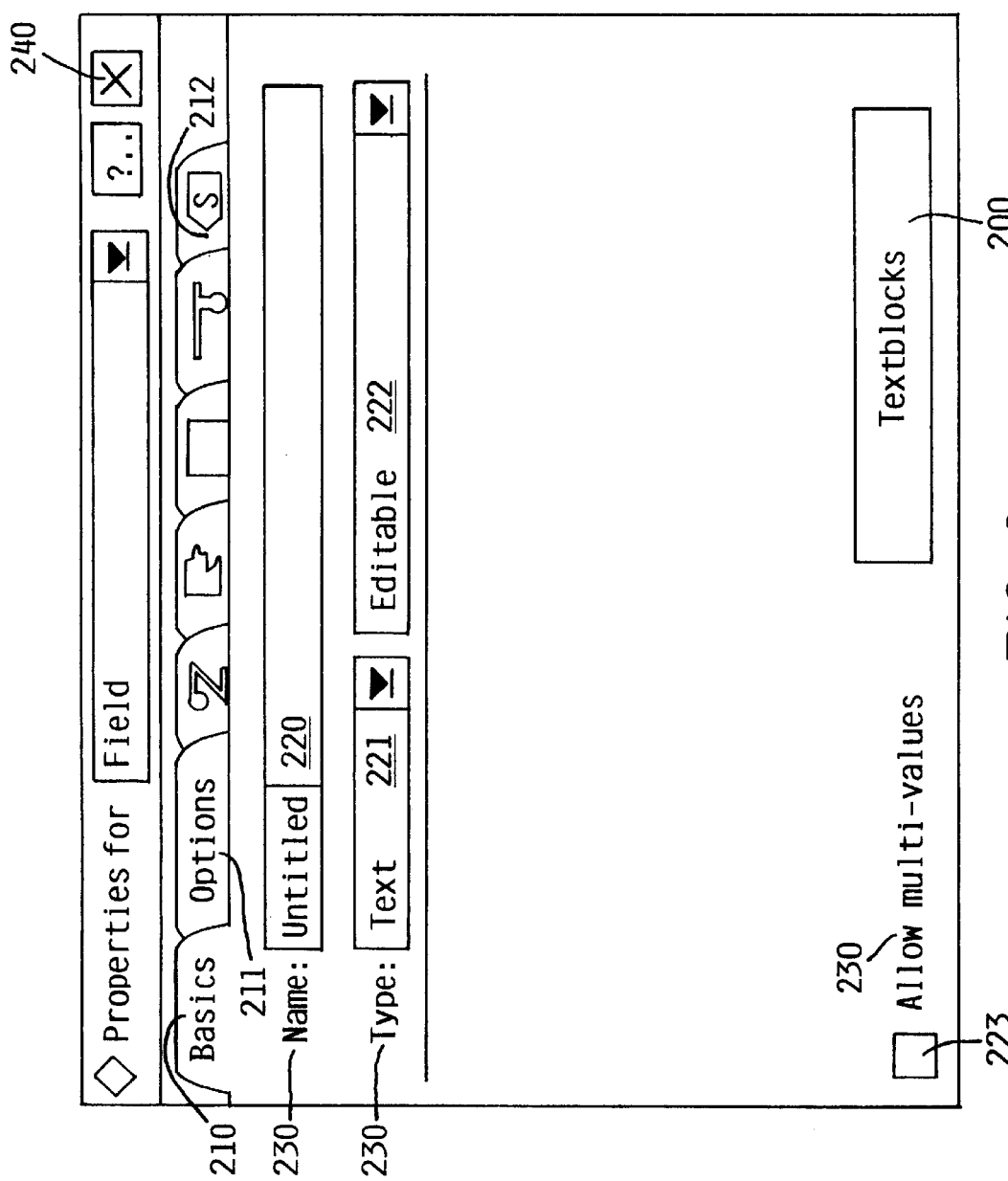
FIG. 2 shows the result of choosing the action "Create Field": a static Lotus Notes window is opened. A GUI element, the button named "Textblocks", is integrated into this static window. It looks as if it is a part of the Lotus Notes window, but it is controlled by a supplementary application and generated dynamically and transparently to the main application.

FIG. 1 shows such a standard situation within the Lotus Notes application. In the context of the user interface control depicted by FIG. 1 a user chooses the action "Create Field" within the main application initiating navigation to that user interface control of the main application which will be extended by a supplementary user interface control of the supplementary application. Referring to FIG. 1 first, the end-user has to select "Create" in the Lotus Notes main menu bar (100). In the displayed sub-menu, the end-user has to choose "Field" (101). As a result of this two choices the main application Lotus Notes displays a new user interface control, in the current case a static window, which is depicted in FIG. 2. The user interface control of FIG. 2 serves the purpose to allow a user to create a certain field of a user-specified type within the context of Lotus Notes. In this static window, a tab control is displayed. The fist tab, "Basics" (210), is always active by default. This tab normally contains some static text (230), a text entry field (220), two selection fields (221,222) and a check box (223). New within this user interface control of FIG. 2 and not controlled by the main application Lotus Notes is the button "Textblocks" (200) (of course the current invention would support creation and control of any other user interface control instead of a push button). This button is no element of this tab control nor of the whole static window. It has been put there dynamically and transparently to the main application by the self-written supplementary application exploiting the integration technology of the current invention. For a user unfamiliar with Lotus Notes, there is no noticeable difference between the common GUI elements of Lotus Notes and the new GUI element of the self-written application.

Figure 3:
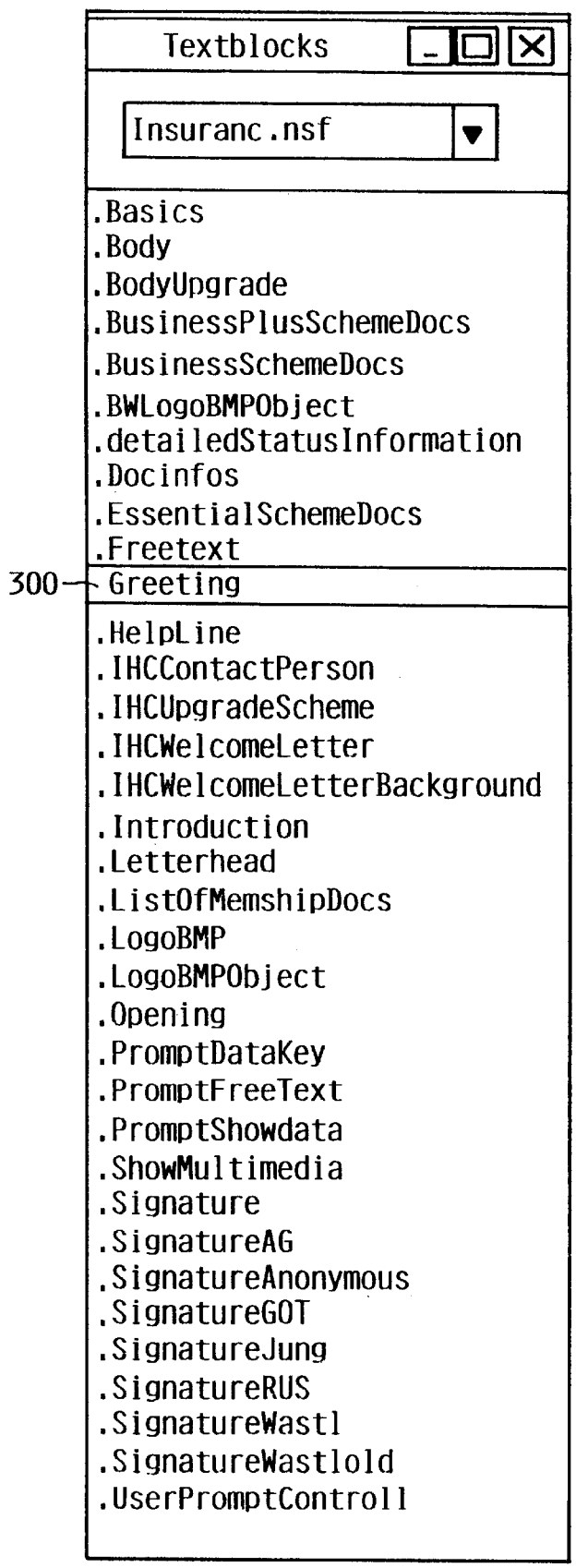
FIG. 3 shows what happens if the button "Textblocks" is pressed: the additional application opens a listbox which shows all the building blocks available in specific databases; i.e. what happens if the dynamically added supplementary application is responding.
Figure 4:
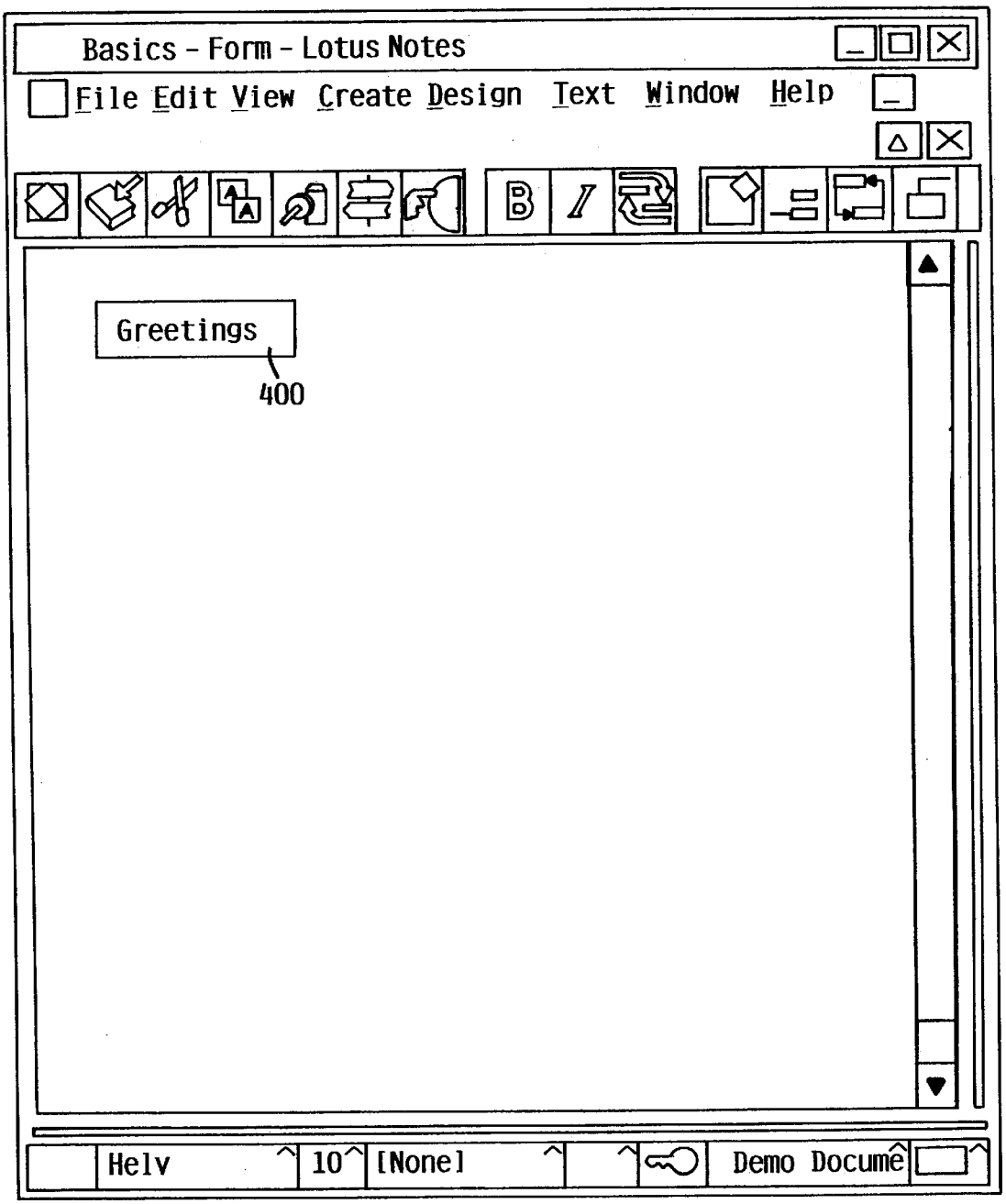
FIG. 4 shows the result after clicking a name in the listbox—a field with that name is created in a Notes form; thus it is visualized how the output of the interaction result of the supplementary application is finally returned to the main application.

If the button "Textblocks" (200) is pressed, the integration technology of the current invention takes care that a function inside the self-written application is called which displays and controls a further user interface control; in the current example it is a window with a list box as depicted in FIG. 3. If an entry like "Greetings" (300) is selected via double-click, the said function takes this entry and puts it in the text entry field (220); i.e. the integrated supplementary application is also capable to cooperated with the main application with respect to data exchange between them. After that, the self-written function closes the static window as if the user had pressed the close button (240), thus forcing Lotus Notes to create a field with the name selected in the integrated user interface control, a list box, displayed by the self-written application. This final situation is visualized in FIG. 4.

With this additional functionality, it's much more comfortable for a user to create fields with names of available text blocks. And the user even doesn't notice that the additional functionality comes from another application.

Figure 5A:
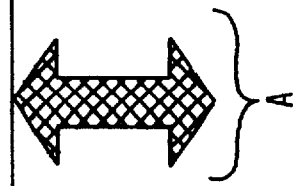
Figure 5B:
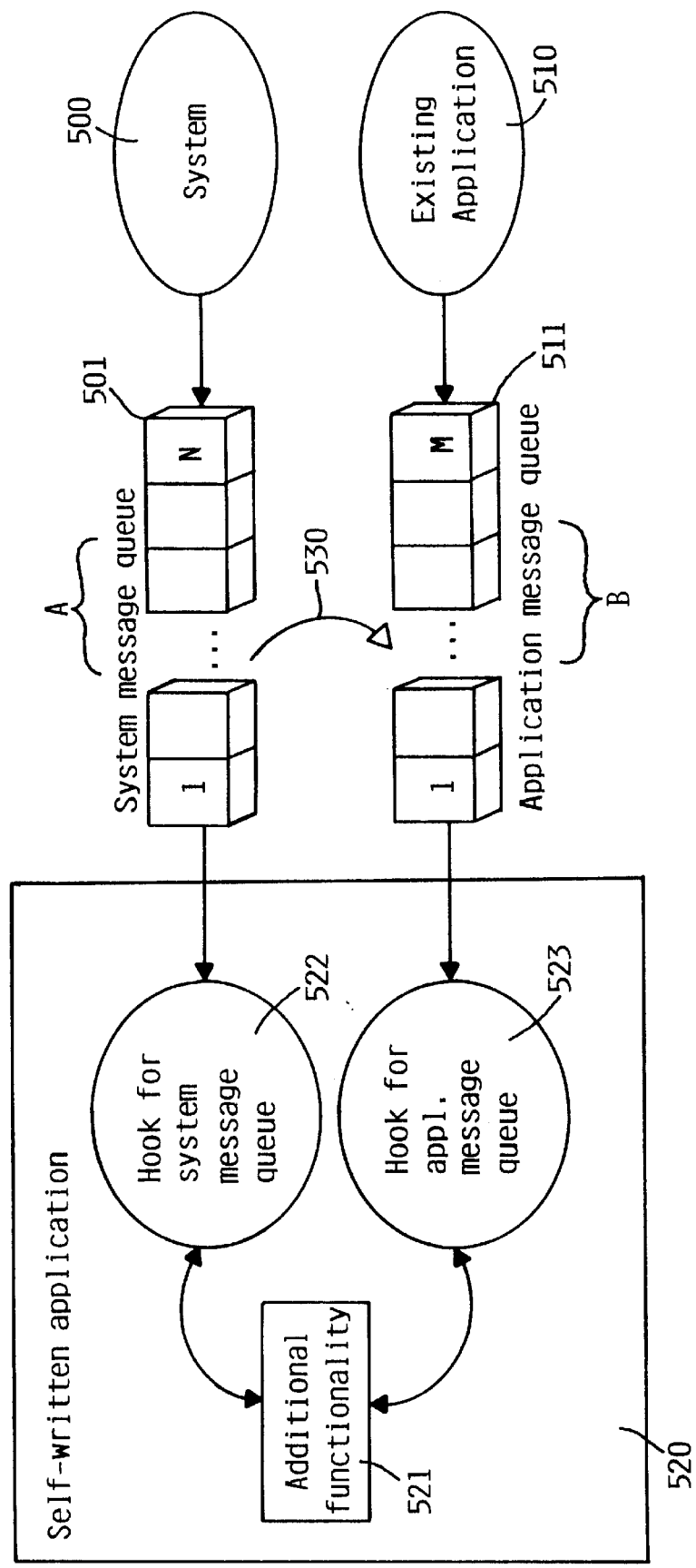

In order to retrieve all the relevant technical information, the current invention suggests a certain cooperation of the system and application message queues. FIG. 5 shows in more detail, how this cooperation works and why it is necessary.

The system message queue (501) is filled by the operating system (500) with certain information elements called messages (as defined above). These information elements are symbolized by the cubes 1 to N, and they contain information which is typical for message based operating systems (502). The application message queue (511) is filled by the existing main application (510). These information elements are symbolized by the cubes 1 to M, and they contain information which is typical for message based applications (512). The technical information which is required by the supplementary application according to the example above, which allows it to seamlessly integrate its function extension (the control (200)) into the main application as hosting application is:

- the information whether a static window belongs to the particular "create field" event (100, 101) represent that specific message to the main application, which will trigger it to set up the particular user interface control to be extended by the supplementary user interface control. It has to the noted that a multitude of such events could have occurred and thus it has to be made sure that "correct" event is identified.
- the information, at which time a static window (representing the context of the main application wherein the supplementary user interface control is to be integrated) is finally built; otherwise the newly created button might disappear as a result of a refresh action.

size and position of the static window.

the handle of the control within which the supplementary control is to the integrated and for instance the handles of other parts of that control like the text entry field (220).

As depicted in (502) and (512), none of the queues contains all of the information needed. The application message queue (512) knows for instance all about size, position and the handles of text entry fields of a static window, but nothing about the fact that this particular window is the one produced in response to the "create field" event. On the other hand, the system message queue (502) contains for instance the information at which time a "create field" event occurs, but nothing about size and position, handles of text entry fields or if a static window is finally built.

Expressed in a nutshell, from the system message queue the information can be extracted "that" and "when" a request for creating said awaited user-interface control is issued. Based on this knowledge from the application message queue the precise handle used by the GUI system for identification purposes of that user interface control can be determined which allows to determined sizes, positions etc. allowing to create the supplementary user interface control in context of the user interface control of the main application.

But the self-written application (520) has an application (523) and a system message hook (522) which take information elements out of both queues. If the system and application message hook work together, all the necessary information is available to the self-written application. One can think of it as if certain elements of information were taken out of the system message queue and inserted at a defined place into the application message queue (530) or vice versa.

Figure 6A:
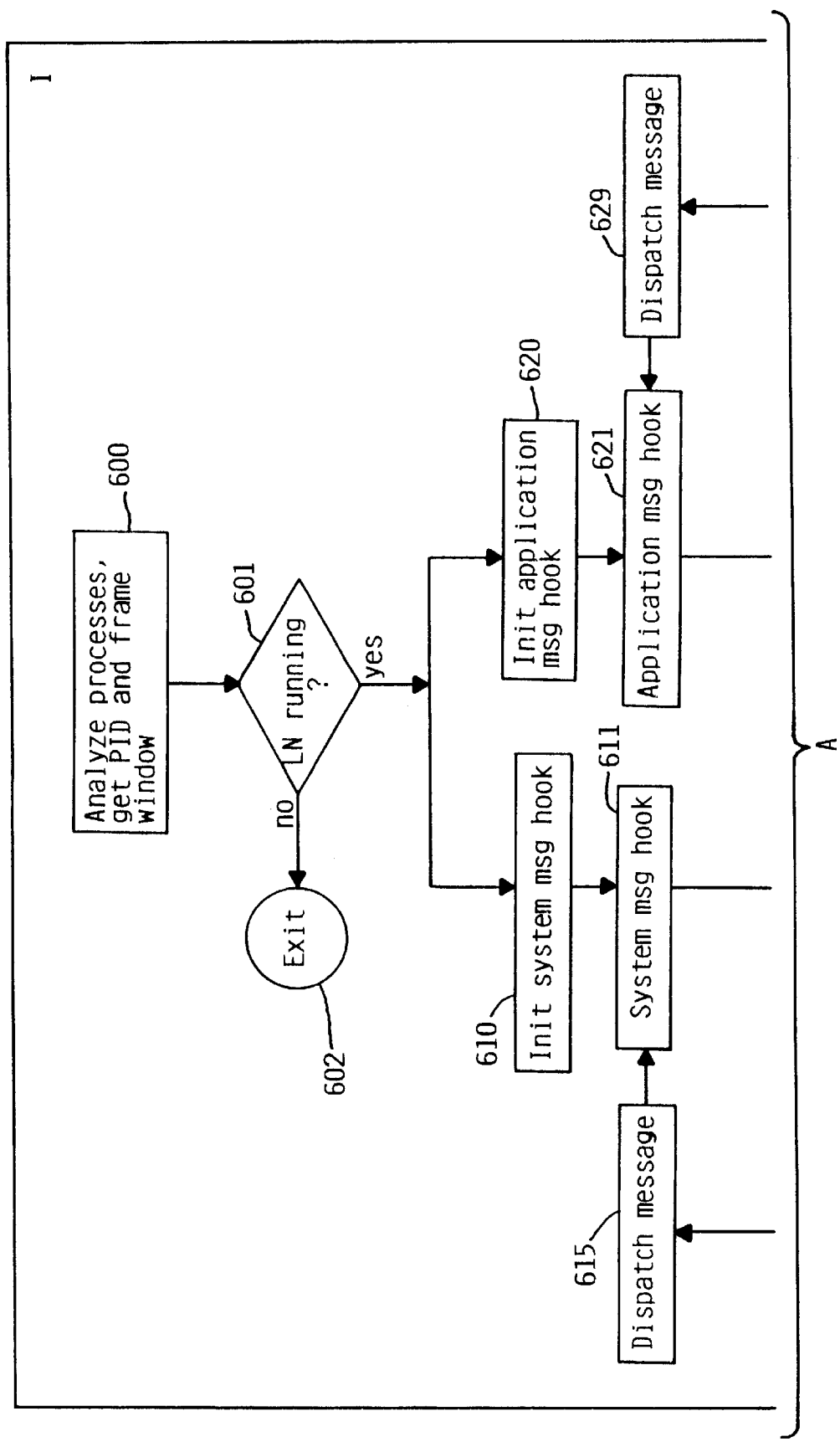
FIGS. 6A, 6B, and 6C (hereinafter referred to as FIG. 6) show a flowchart, describing the inter-operation of the system and application message hook for transparently and dynamically adding a supplementary user interface control being added by a supplementary application.
Figure 6B:
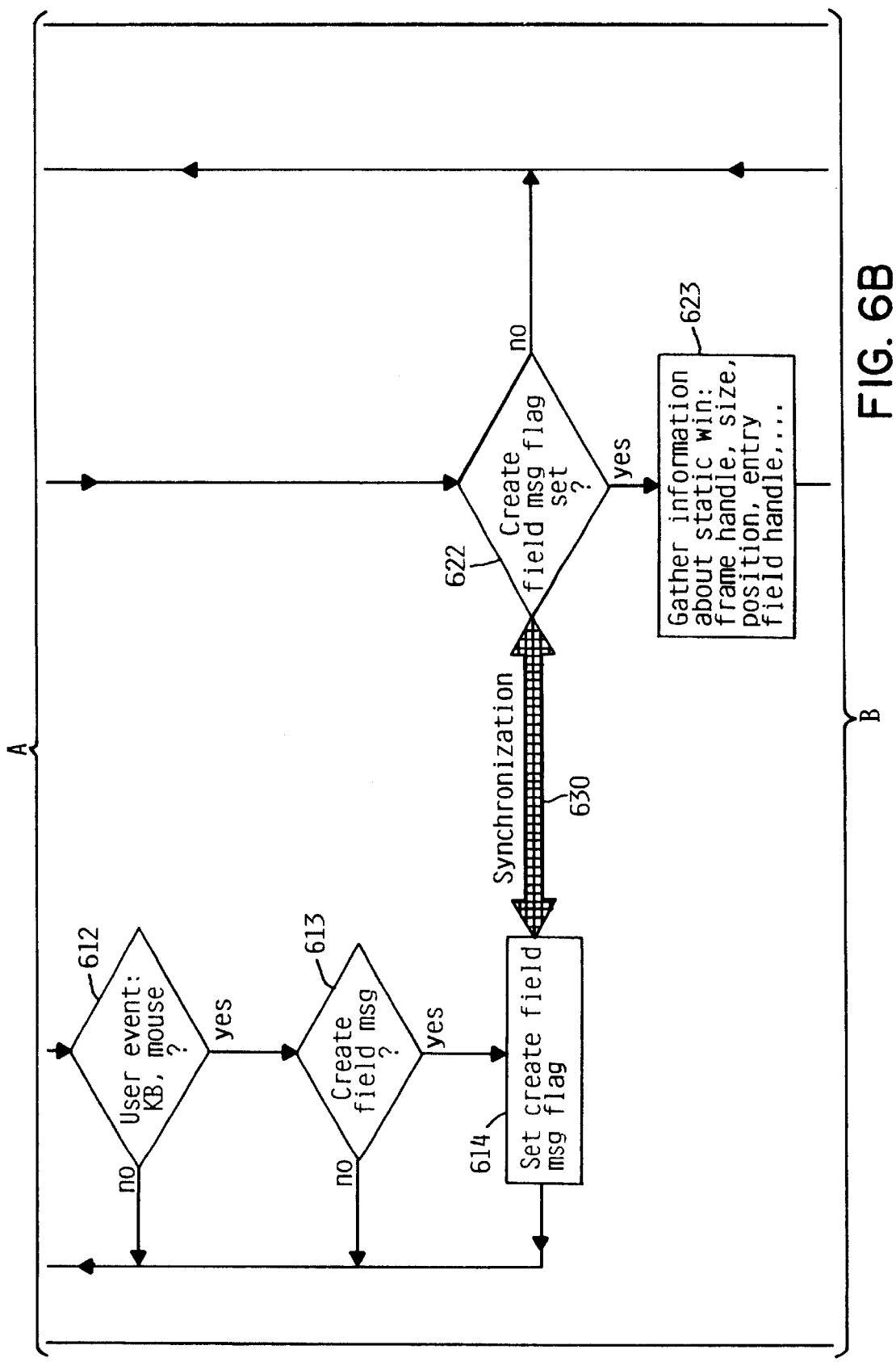
Figure 6C:
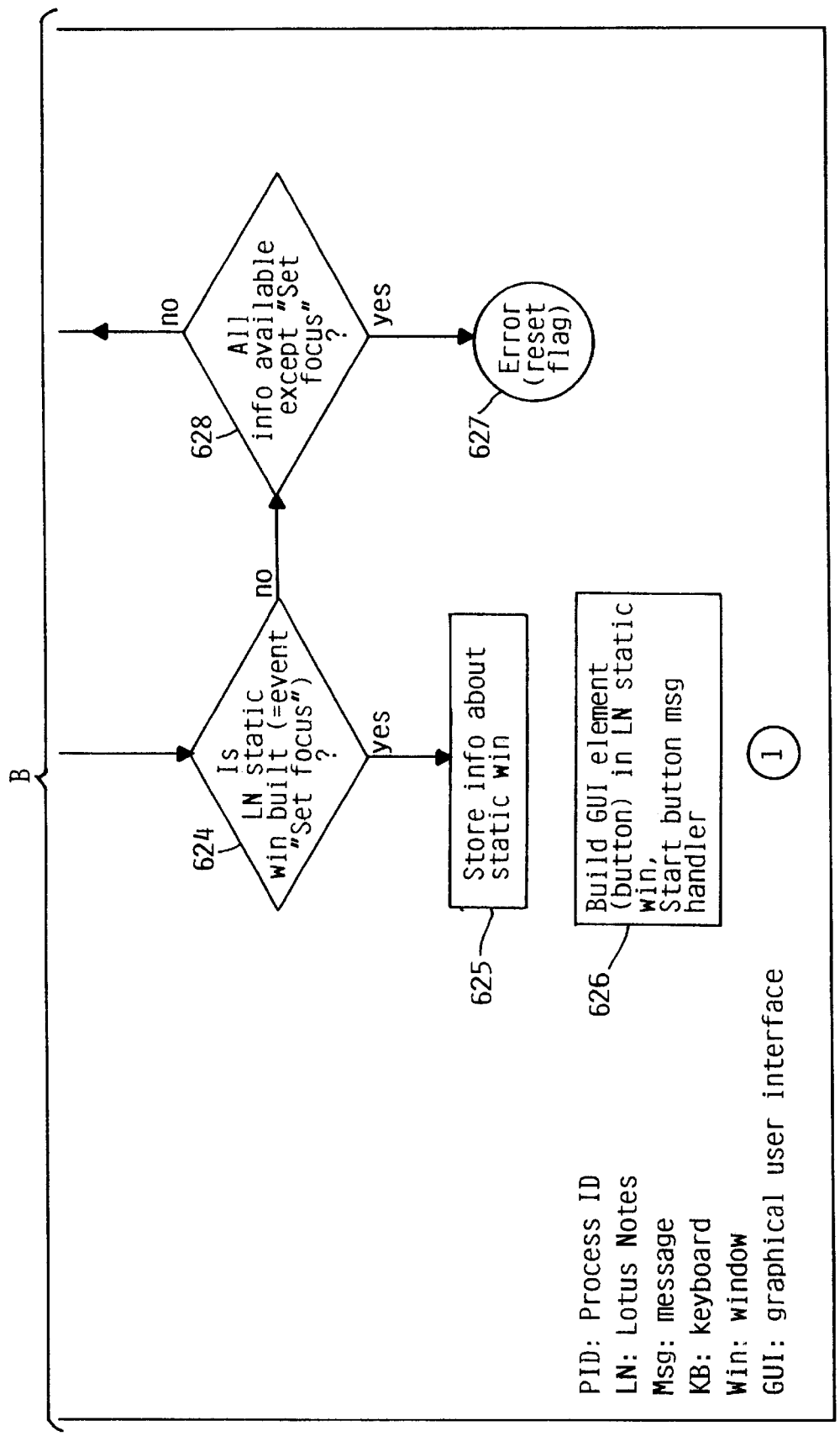

FIG. 6 shows a flowchart, describing the inter-operation of the system and application message hook for transparently, non-invasively to the main application and dynamically adding a supplementary user interface control being added by a supplementary application according to the current invention applied to the current example.

According to the proposed integration technology the self-written, i.e. supplementary, application starts with an analysis of the currently running processes and gathers information about them like process-id (PID) and process name (600). If the existing application to be extended with additional functionality, which is in this example Lotus Notes (LN), is not running, the self-written application terminates (601). If the existing application is running, the self-written supplementary application is setting up two message hooks (610, 620) which run concurrently: the system message hook (611) and the application message hook (621, hook for the existing application). In this example, the system message hook is initialized using the process-id of the existing application for tailored monitoring purposes. This means the system message hook receives system information related to this application.

Since both hooks are running in parallel, there has to be a synchronization (630). This is done via a new indicator, which will be raised when said monitored "create field" message has been detected, the "create field message" flag. The application message hook permanently receives messages from the application all the time, but analysis and further processing is only done if the said flag is set to true.

A closer look at the system message hook, responsible for setting this flag: The system message hook permanently receives information (i.e. via the messages) from the system concerning the existing application by monitoring the system message queue. As long it is no keyboard or mouse event (612), the information is passed on to the application (615). Otherwise, there is a check if this keyboard or mouse event is the awaited "create field" message (613) of the monitored main application. If the awaited message is recognized, the "create field message" flag (614) is set to true. After that the message is dispatched to the application, to be processed by the main application resulting in a series of messages occurring during the process of creating the overall control depicted in FIG. 2 which then will be detected by the application message hook.

Thus synchronization (630) of system and application message hook is done primarily via the "create field message" flag (614). But since both hooks work asynchronous, this flag alone might not be sufficient. Depending on the overall system performance and details of the dispatching it might happen that all the relevant information which has to be provided by the application message hook is already taken out of the queue and discarded before the system message hook is able to set the "set field message" indicator. The reason for this scenario is that the system message hook is just about to set the said flag when the operation system decides to give execution time to the application message hook. The use of semaphores, state of the art solution to such problems, would slow down the system, because the application message hook would be blocked until the system message hook has totally finished analyzing each message.

The solution of the synchronization problem the solution with much less control overhead requiring only enhancements within the system message hook is to remove the "create field" message temporarily from the queue. If the "create field" event is taken out of the system queue, the application can't do anything until the system hook dispatches this message to the application by reinserting the "create field" message into the queue again. Meanwhile, between the removal and reinsertion of the message, the system message hook can set the "create field message" and perform optional additional processing with all the time needed to do this. The important thing is that after said flag is set, the "create field" event is dispatched to the application.

After the indicator, "create field message" flag, is set to true, the application message hook has already one important piece of information: the next series of subsequent messages from the application will relate to the processing triggered by the "create field" message for creating and setting up the dialog box of FIG. 2. Thus the application message hook is able to extract the awaited technical information from these messages; that is: size and position of the static window, the handle of the text entry field inside the static window (623) and at which time the static window we want to modify is finally built. This series of subsequent messages is not interrupted by the application message hook. After extracting the required technical information, the message containing it is dispatched to the application (629). The last message indicating that the static window is finally built is "set focus" (624). If this message isn't received at the end of the messages series, an error occurred during the creation of the static window. In this case, the "create field message" flag is set to false via (628, 627). After the static window was created, the gathered information (see above) is stored (625). Then the additional GUI element, the button "Textblocks", is built and the button message handler is started (626).

Figure 7A:
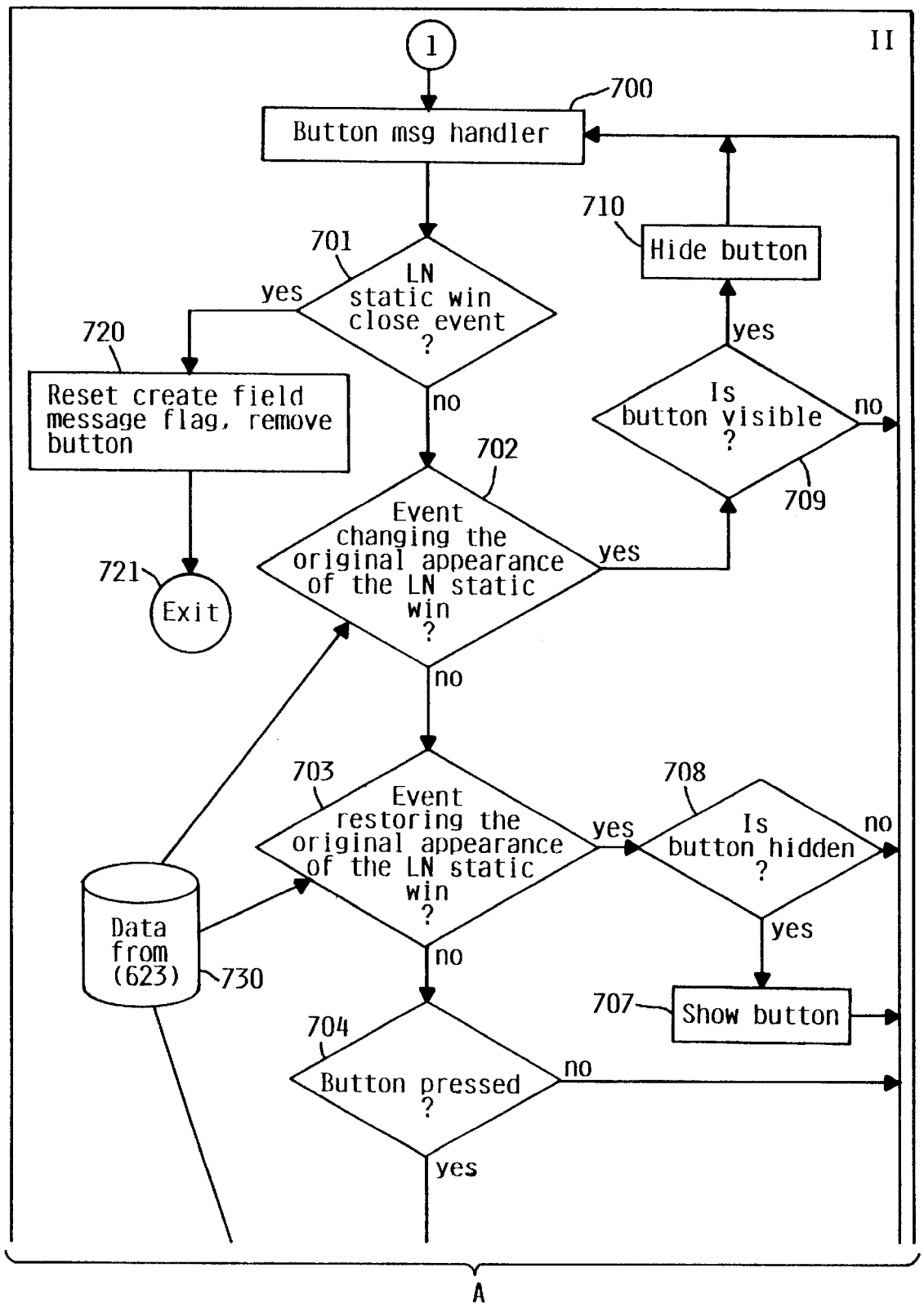
FIGS. 7A and 7B (hereinafter referred to as FIG. 7) show an extension of the flowchart of FIG. 6, describing the additional adaptation behavior of the supplementary user interface control influencing visibility of that control.
Figure 7B:
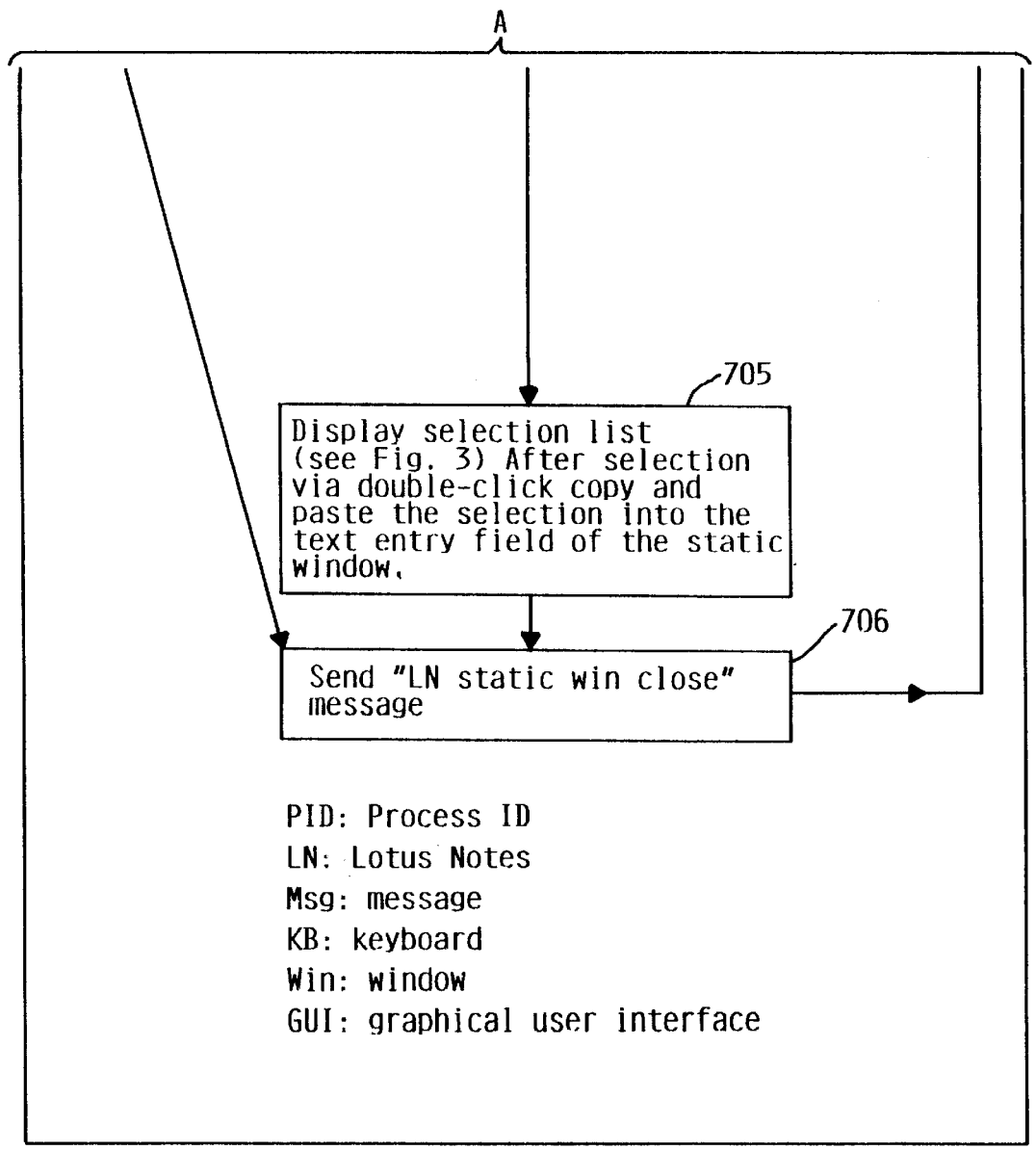

Once the supplementary user interface control has been integrated within the main's application user-interface the application hook takes over additional processing responsibilities. Depending on the user interacting with the user interface control visibility, position, size or other representation characteristics may change. As a solution the message hook permanently monitors the application message queue for messages indicating such changes of representation. As an extension of the flowchart of FIG. 6, FIG. 7 describes the additional adaptation behavior of the supplementary user interface control influencing visibility of that control.

The button message handler (FIG. 7) receives events which are related to the button, like "Button pressed", and events related to the Lotus Notes static window, i.e. related to the user interface control of the main application. First, there is a check if a new event is the "LN static win close" event (701), indicating a "close" request of that user interface control. In this case, the "create field message" flag is reset, the button removed and the handler exits (720,721). Then there is a check if the new event is going to change the original appearance (702). This happens for example if the user presses another tab like (211). If this is true, the button has to be removed. This is done via (709,710). Next check (703) is, whether the new event does just the opposite—restoring the original appearance. This happens for example if the tab (210) is pressed. In this case, the button must be shown again (708,707). The last question is, whether the new event signals "Button pressed" (704). In this case the selection list of FIG. 3 is displayed (705). After one text block name is chosen via double-click, the name is transferred via "cut and paste" into the text entry field of the static window (220). Then the close message is sent (706). This close message causes an "LN static win close" message, which is posted to the Lotus Notes static window.

What is claimed is:

1. A method for dynamically extending a main application comprising a first user-interface-control by at least one supplementary application, and said user-interface-control participating in a graphical-user-interface (GUI) system, and said method comprising a first-step of monitoring system-messages of a system-message-queue, said system-message-queue transferring one or more system-messages comprising user-interaction-requests to said main application, and said first-step monitoring said system-messages by determining if a monitored system-messages comprises a user-interaction-request for creating said first user-interface-control of said main application, and said first-step, in the affirmative case, setting an indicator that said user-interaction-request for creating said first user-interface-control has been detected, and said method comprising a second-step monitoring application-messages of an application-message-queue, said application-message-queue transferring one or more application-messages comprising a request for said main application, and said second-step associating in response to setting said indicator the next one or multitude of application-message with said monitored system-message, and said method interpreting said next one or multitude of application-message as application-message comprising the request for creating said first user-interface-control by determining based on said next application-message a first user-interface-control-handle, which is used by said GUI system as unique identification of said first user-interface-control, and said method executing said supplementary application.

2. A method according to claim 1, said method executing said supplementary application depending on input data of said main application accessible by said first user-interface-control-handle and/or returning output data generated by said supplementary application to said main application.

3. A method according to claim 1, said method comprising a creation-step exploiting said first user-interface-control-handle for creating a supplementary user-interface-control in context of said first user-interface-control said supplementary user-interface-control being responsive to user interactions and being controlled by said supplementary application.

4. A method according to claim 3, wherein in said first-step, if said user-interaction-request for creating said first user-interface-control has been detected, said monitored system-message is first removed from said system-message-queue before said indicator is set and then optional additional processing is executed and wherein finally said monitored system-message is reinserted again.

5. A method according to claim 3, said second-step comprising an adaptation-step determining, after said supplementary user-interface-control has been created, if a further application-message relates to said first user-interface-control, and determining in the affirmative case, if said further application-message indicates one of the following:
   a request to change said first user-interface-control, which should change the visibility and/or representation of said supplementary user-interface-control, in which case the supplementary user-interface-control is set visible or invisible respectively; and/or
   a request to remove said first user-interface-control, in which case said supplementary user-interface-control is removed and said indicator is reset.

6. A method according to claim 3, wherein said supplementary application exploits said first user-interface-control-handle to propagate modifications due to user interactions with said supplementary user-interface-control to said first user-interface-control.

7. A method according to claim 6, wherein, once said indicator has been set, all application-messages are monitored, and wherein said indicator is reset, if no application-message indicating that said first user-interface-control has been created successfully is monitored.

8. A method according to claim 2, wherein said first user-interface-control is a frame-window or dialog-box, and/or wherein said supplementary user-interface-control is any user-interface-control provided by said GUI-system like a button, or a list-box, or an input/output field or a combination thereof, and/or wherein said main application is Lotus Notes.

9. A method according to claim 2, wherein said input data comprises user interactions with said first user-interface-control and store it in a protocol-record; and/or wherein said output data comprises stored user interactions, with said first user-interface-control to be processed by said main application.

10. A system comprising means adapted for carrying out a method of dynamically extending a main application comprising a first user-interface-control by at least one supplementary application, and said user-interface-control participating in a graphical-user-interface (GUI) system, and said method comprising a first-step of monitoring system-messages of a system-message-queue, said system-message-queue transferring one or more system-messages comprising user-interaction-requests to said main application, and said first-step monitoring said system-messages by determining if a monitored system-messages comprises a user-interaction-request for creating said first user-interface-control of said main application, and said first-step, in the affirmative case, setting an indicator that said user-interaction-request for creating said first user-interface-control has been detected, and said method comprising a second-step monitoring application-messages of an application-message-queue, said application-message-queue transferring one or more application-messages comprising a request for said main application, and said second-step associating in response to setting said indicator the next one or multitude of application-message with said monitored system-message, and said method interpreting said next one or multitude of application-message as application-message comprising the request for creating said first user-interface-control by determining based on said next application-message a first user-interface-control-handle, which is used by said GUI system as unique identification of said first user-interface-control, and said method executing said supplementary application.

11. A data processing program for execution in a data processing system comprising software code portions for performing a method of dynamically extending a main application comprising a first user-interface-control by at least one supplementary application, and said user-interface-control participating in a graphical-user-interface (GUI) system, and said method comprising a first-step of monitoring system-messages of a system-message-queue, said system-message-queue transferring one or more system-messages comprising user-interaction-requests to said main application, and said first-step monitoring said system-messages by determining if a monitored system-messages comprises a user-interaction-request for creating said first user-interface-control of said main application, and said first-step, in the affirmative case, setting an indicator that said user-interaction-request for creating said first user-interface-control has been detected, and said method comprising a second-step monitoring application-messages of an application-message-queue, said application-message-queue transferring one or more application-messages comprising a request for said main application, and said second-step associating in response to setting said indicator the next one or multitude of application-message with said monitored system-message, and said method interpreting said next one or multitude of application-message as application-message comprising the request for creating said first user-interface-control by determining based on said next application-message a first user-interface-control-handle, which is used by said GUI system as unique identification of said first user-interface-control, and said method executing said supplementary application.

12. A computer program product stored on a computer usable medium, comprising computer readable program means for causing a computer to perform a method of dynamically extending a main application comprising a first user-interface-control by at least one supplementary application, and said user-interface-control participating in a graphical-user-interface (GUI) system, and said method comprising a first-step of monitoring system-messages of a system-message-queue, said system-message-queue transferring one or more system-messages comprising user-interaction-requests to said main application, and said first-step monitoring said system-messages by determining if a monitored system-messages comprises a user-interaction-request for creating said first user-interface-control of said main application, and said first-step, in the affirmative case, setting an indicator that said user-interaction-request for creating said first user-interface-control has been detected, and said method comprising a second-step monitoring application-messages of an application-message-queue, said application-message-queue transferring one or more application-messages comprising a request for said main application, and said second-step associating in response to setting said indicator the next one or multitude of application-message with said monitored system-message, and said method interpreting said next one or multitude of application-message as application-message comprising the request for creating said first user-interface-control by determining based on said next application-message a first user-interface-control-handle, which is used by said GUI system as unique identification of said first user-interface-control, and said method executing said supplementary application.

* * * * *